Figure 1:
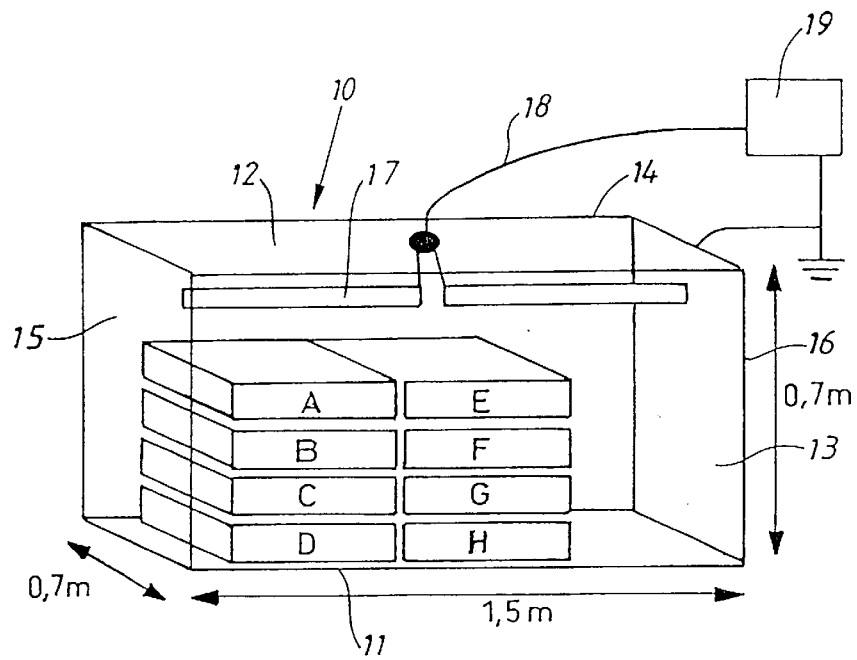

United States Patent

Ekemar

[11] Patent Number: 5,977,532
[45] Date of Patent: Nov. 2, 1999

[54] METHOD AND APPARATUS FOR USING ELECTROMAGNETIC RADIATION TO HEAT A DIELECTRIC MATERIAL

[75] Inventor: Lars Sven Erling Ekemar, Taby, Sweden

[73] Assignee: Antrad System AB, Stockholm, Sweden

[21] Appl. No.: 08/704,516

[22] PCT Filed: Mar. 6, 1995

[86] PCT No.: PCT/SE95/00235

§ 371 Date: Sep. 6, 1996

§ 102(e) Date: Sep. 6, 1996

[87] PCT Pub. No.: WO95/24818

PCT Pub. Date: Sep. 14, 1995

[30] Foreign Application Priority Data

Mar. 8, 1994 [SE] Sweden .................................. 9400779

[51] Int. Cl.[6] .............................. H05B 6/72; H05B 6/80
[52] U.S. Cl. .......................... 219/748; 219/679; 219/764; 219/756; 219/770; 34/255
[58] Field of Search .................. 219/678, 679, 219/715, 717, 746, 748, 764, 770, 756, 771; 34/255, 259

[56] References Cited

U.S. PATENT DOCUMENTS

| 2,602,134 | 7/1952 | Nelson | 219/725 |
|---|---|---|---|
| 3,594,531 | 7/1971 | Hough | 219/756 |
| 3,619,536 | 11/1971 | Boehm | 219/748 |
| 3,691,338 | 9/1972 | Chang | 219/748 |
| 3,843,862 | 10/1974 | Staats et al. | 219/748 |
| 3,953,702 | 4/1976 | Bickel | 219/748 |
| 4,978,501 | 12/1990 | Diprose et al. | 422/22 |
| 5,276,924 | 1/1994 | Hachima | 4/111.1 |
| 5,487,873 | 1/1996 | Bridges et al. | 219/679 |
| 5,593,713 | 1/1997 | Luz-Martinez et al. | 219/771 |

FOREIGN PATENT DOCUMENTS 446 682  9/1986  Sweden .

*Primary Examiner*—Philip H. Leung
*Attorney, Agent, or Firm*—Fildes & Outland, P.C.

[57] ABSTRACT

According to a method for the heating of dielectric materials, the heat generation is done by oscillating electromagnetic radiation of one or more frequencies within the frequency range 300 kHz–299 MHz, preferably within the frequency range 1 MHz–299 MHz and best of all within the frequency range 12 MHz–200 MHz. In an apparatus for the heating of dielectric materials, preferably of organic nature, the heat is generated by oscillating electromagnetic radiation within the frequency range 300 kHz–299 MHz. The apparatus comprises a chamber (10) consisting of an upper wall (12), a bottom wall (11) and side walls (13, 14, 15, 16) made of electric conducting materials, which walls together with at least one generator (19) are connected to a common reference potential at which the generator (19) is arranged to feed at least one with the chamber cooperating antenna (17) in order to get the electromagnetic radiation in this chamber.

15 Claims, 1 Drawing Sheet

METHOD AND APPARATUS FOR USING ELECTROMAGNETIC RADIATION TO HEAT A DIELECTRIC MATERIAL

This invention relates to the heating of materials, which show dielectric properties and thus are susceptible for electromagnetic radiation within the frequency range from low radio frequency into ultra-high frequency where the latter frequency range commonly is called the microwave range.

Heating in microwave ovens is an established technique fast to thaw and cook frozen food-stuffs or to prepare dishes out of fresh, primary materials. A serious problem tied to the preparing in microwave ovens is, that the food-stuffs are unevenly heated owing to the small penetration depth of the radiation conditioned by the high frequency. A result commonly experienced is, that the food-stuff to be cooked is burnt on its surface while its inside not yet has reached the necessary preparation temperature.

Microwave ovens primarily are used for the heating of small batches, particular in order to save time. This requisite also exists as to the heating of large masses of organic materials, as at industrial food-stuff preparation, the drying of peat mulch and paper fibres, the sterilizing as well as the drying of offals and, the starting, the maintaining and the finishing of microbiological processes such as the rising of doughs, the fertilizing of vegtable waste residues and the rottening of wood fibres. There are needs to control chemical processes by heating, such as hardening reactions in plastics and composite materials. Further, needs are discerned, which are related to processes implying the treatment of wood chips and wood fibres with rottening fungi and other microorganisms in environmentally adapted pulp industries. All these different processes have in common, that it is particulary advantageous, that they are done by homogenous heating throughout the volumesin question.

The making of composts means the decomposition of vegetable residues by the use of microorganisms in aerobic processes. It is an established technique. The decomposition processes are carried out in for the purpose adapted vessels. Precise temperature control and suitable airing are necessary but difficult to maintain.

The processes work theoretically. As the masses of vegetables as well as of other biological residues often are characterized by an uneven water distribution, a frequent consequence is, that the decomposition processes within a batch differ in various parts as to timing and resulting end products. If the biological residues hold high contents of protein rich wastes, as a rule it is necessary to add or generate more energy for reaching and maintaining an optimal temperature.

Different techniques to convey heat have been tested. In the absence of anything better some of them are used. The use of radiators has shown, that hard, dry, and, heat isolating crusts easily are formed. Such crusts must continually be removed or avoided to arise and grow. The latter can be done by stirrino. Sawdust or other suitable ingredients are frequently added to generate necessary additional heat, implying reduced volume utilisation and raised process costs. Thuseconomic realities necessitate an elimination of at least a minimization of additions. The need of optimal heating is obvious to reduce additions.

It is envisioned, that one favourable, environmentally interesting route within paper and pulp industries will be the treatment of wood chips and wood fibres with rot fungi and other microorganisms. This will imply an emphasis upon a homogeneous temperature distribution within as well as a precise temperature control of large volumes.

Inevitable hygienic demands mean that composts and sludges have to be sterilized and dried at, even temperatures warranting hygienic safe and commercially manageable end products. A measure often taken to facilitate a drying process is to use vacuum. However, the evaporation of water consumes a lot of energy. A drying process has to pass homogenously throughout the whole volume of a batch. A cost efficient processing as well as quality improved end product is achieved, if heat is appropriatele transferred to or generated within the batch.

Within chemical industries there are economic and technical requirements for processes, which should gain considerably, if large volumes difficult to heat could be heated fast and homogeneously, for example organic liquids as well as mixtures of organic and inorganic liquids of high viscosity with as well as without solid particles.

Within food industries as well as within other food preparing enterprises—e.g. restaurants, hospital kitchens, school kitchens—there is a need of apparatuses, which can be used for heating. One example is the cooking of potatoes. Steam cooking is still in use which is objectionable as regards nutritive values and taste experiences.

Different courses to tackle the difficulties in order to reach an optimal heattransfer have been tried for example by convection, by radiation, by microwaves and, by traditional high frequency technique. The drawback of heat transfer to a volume of materials whatever it consists of, is, when it is done by conventional heating or radiation as well as by microwaves, that the heating is characterized of being inhomogeneous i.e. of temperature gradients. Heating by convection and radiation does not rarely cause serious difficulties with crust formation. As microwaves are characterized by low penetration depths, they often cause problems with moving zones of dried materials and masses. Traditional high frequency technique based on alternating or on pulsed direct currents from electrode pairs means bulky, expensive apparatuses. It is inflexible in relation to batch size variations. The demands for the homogeneity of materials and masses as to their dielectric characteristics are pronounced This invention serves the purpose to eliminate the above mentioned problems and to offer a method and an apparatus the use of which a homogeneous heating of dielectric materials is a reality, in particular organic materials and masses, and/or mixtures of organic and inorganic materials and masses in large volumes or batches. The purpose is reached by a method characterized in claim 1 and by an apparatus characterized in claim 5. In particular preferred processing steps as well as preferred design particulars are given in adherent additional claims.

In comparison with other heating methods the invention offers for not entirely known reasons homogeneous heat generation also in large volumes characterised by axes slightly differing in length. Equalization is furthered between moist and dry parts. The invention offers outstanding conditions to raise and hold temperatures in order to start, maintain and, complete aerobic and anaerobic processes in solid and semisolid materials and masses. It is particularly favourable to the sterilizing and drying of composts, sludges and plant earths etc, and as well as to the drying of wood, wood chips, wood fibres, paper and paper fibres. Various chemical reactions with organic substances, partly or entirely involved. as well as food preparation in industries, restaurants and households are carried out with advantage by heating in accordance with the invention. By means of an application of the invention cost efficiency can be reached.

Figure 2:
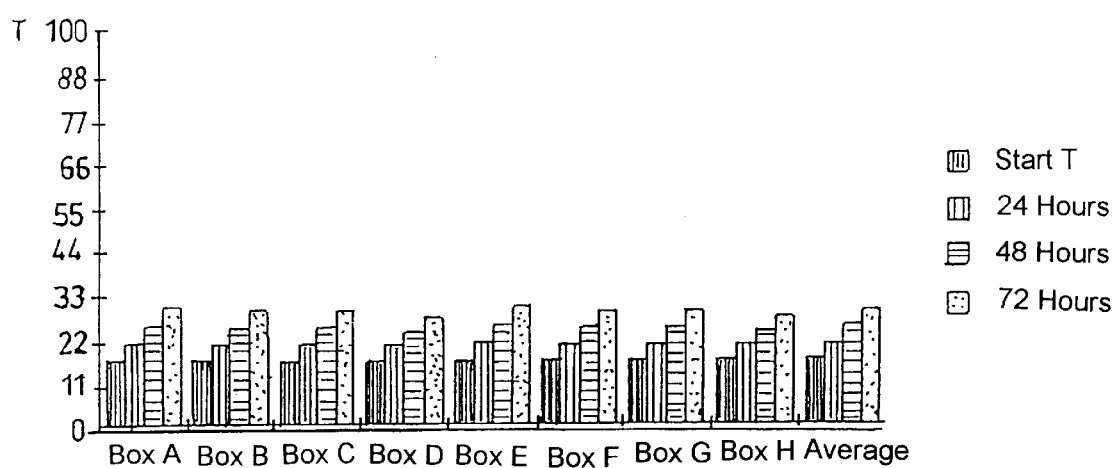

In the following the invention will be described more in detail, partly in connection to a performance example with reference to the attached FIGS. 1 and 2, where FIG. 1 shows a schematic illustration of a chamber arranged for the heating of dielectric materials and FIG. 2 show's a diagram which illustrates the results of a test, where peat mulch charged in boxes was placed in the chamber according to FIG. 1.

A distinctive characteristic of the invention is, that the heat generation is performed in a closed chamber or room, which is enclosed by walls of electrically conducting materials and in which placed antennas emit electromagnetic radiation, also it can be advantageous to have shields of electrically conducting materials in the chamber. The walls and shields are for example made of metal sheets, metal nets or other electrically conducting materials. In FIG. 1 the chamber 10 has the shape of a rectangular parallelepiped w with a bottom wall 11, an upper wall 12, two long walls 13, 14 and, two short walls 15,16. A dipole antenna 17 is placed below the upper wall and is fed through a schematically shown wire 18 by a high frequency generator 19. The above mentioned boxes, eight in number, have been placed on the bottom wall 11 and are designated with the letters A–H.

The heat generation is done by means of oscillating electromagnetic radiation within the frequency range 300 KHz–299 MHz, preferably within the frequency 10 MHz–299 MHz and, best of all within the frequency range 12 MHz–200 MHz. The antenna 17, which can be replaced by more antennas, is installed inside the chamber 10. The radiation emitted by the antenna is reflected by the walls of the chamber back to the material, which is to be heated.

A theory, is that, the electromagnetic radiation emitted by the antenna or the antennas forms overtones, which are conditioned by the ratio between the dimensions of the chamber and the wavelength/wavelengths of the radiation emitted by the antenna/antennas.

In accordance to the mentioned theory it is probable, that formed overtones improve the conditions of the heat generation within the material charged in the chamber. This is valid and is independent of the dimensions of the chamber as long as any wavelength, one or more, conditioned by the frequency/frequencies emitted by the antenna/antennas is longer than the shortest side of the chamber and/or longer than the square root of the smallest cross section area of the chamber. Alternatively, this is valid and is independant of the dimensions of the chamber as long as half a wavelength of a radiation frequency is longer than the shortest side of the chamber and/or than the square root of the smallest cross section area of the chamber.

The heat generation within the material charged in the chamber is still more heightened when a radiating antenna, one or more, and its feeding connection/applicator from the sender generator to the resonance frequency of the system formed by the "antenna-the connection/applicator" has a resonance frequency within the interval ±20% of the frequency emitted by the sender generator, preferably within the interval ±10% of the frequency emitted by the sender/ generator and, still better within the interval ±5% of frequency emitted by the sender/generator.

Efficient heat generating within a batch in a chamber requires, that the materials and masses in the batch are characterized by a dielectricitx constant within the interval $2 \cdot 10^{-12} - 8 \cdot 10^{-9}$ As/Vm, preferably within the interval $8 \cdot 10^{-12} - 4 \cdot 10^{-9}$ As/Vm, still better within the interval $1.2 \cdot 10^{-12} - 1 \cdot 10^{-9}$ As/Vm, best of all within the interval $5 \cdot 10^{-11} - 8 \cdot 10^{-10}$ As/Vm and/or a dissipation factor (loss tangent) within the interval 0.0001–70, preferably within the interval 0.0005–40, still better within the interval 0.001–26 and, best of all within the interval 0.002–10,when the materials and masses are heated by an electromagnetic radiation having one or more frequencies within the interval 300 kHz–299 MHz. The dielectric material consists of one or more materials of organic nature, biological or chemical ones, or consists of a mixture of organic or inorganic materials, the latter ones for instance water, aluminum oxide etc. for food preparation, compost making, rottening, drying, sterilisation, pasteurizing or other microbiological or chemical treatment.

The invention entails particular advantages in conection to transformation of organic masses by means of microbiological processes in small scale by the use of small apparatuses as well as in large scale by the use of apparatuses adapted for industrial applications.

When making composts, carrying out other microbiological processes etc the moisture content in oroanic or prefeably organic masses, material, goods etc should be within the interval 30 weightpercent–90 weightpercent, preferable within the interval 35 weightpercent–80 weightpercent and, best of all within the interval 40 weightpercent–75 weightpercent. The moisture content is defined as that weight percentage, which can be vaporized at 105° C. These processes have to be carried out at temperatures within the interval 20° C.–80° C. preferable within the interval 25° C.–65° C. and, best of all within the interval 30° C.–55° C.

When the moisture content in connection to a completing treatment—e.g. drying sterilization etc—goes down in a compost, the heat generation diminishes. Out of this it follows, that energy is reflected back to the antenna/ antennas. The ratio between emitted and reflected back power is measured by means of known technique. In connection to pasteurizing or sterilizing treatments of in particular protein rich wastes, as well as often in connection to food stuff preparation there are changes of chemical structures and thus changes of the back reflection.

Surprisingly, it has been found, that an increase of the irradiated frequency can reduce the back reflection of radiation and simultaneously raise the energy utilization. In order to reach a homogeneous heating a radiation of as long waves as possible ought to be used and the frequency adjusted to give the longest possible wavelength in combination with the lowest possible back reflection.

When a compost is to be dried the drying process is begun with a radiation within the frequency range 300 kHz–299 MHz. As the back reflection increases the emitted frequency/frequencies of the electromagnetic radiation should be raised continously or gradually up to 2500 MHz.

It has been found, that the change of back reflected radiation probably can provide a useful parameter of process control. Thus the measurement of back reflected radiation combined frequency control can form a good indicator of dielectric changes for instance in connection with chemical processes leading to new proportions of compounds and/or to new compounds. Thus, by reflection data measurements at different frequencies of emitted electromagnetic radiation it will be possible to establiche at which stage a chemical process is and is to be stopped.

An apparatus in accordance to the invention has a reaction chamber of the kind shown in FIG. 1 and described above. The chamber has electrically conducting walls which together with the generator 19 connected to a common reference potential. The reference potential normally is an earth potential. The electromagnetic radiation is emitted in the chamber by the antenna 17 and at least one emitted wavelength is longer than the shortest side of the chamber abd/or longer than the square rooot of the smallest cross section area of the chamber. An experiment has been carried out. An chamber with aluminum walls and in accordance with the design in FIG. 1 was charged with 160 kgs wet peat mulch divided into eight plastic boxes A–H. As reference a plastic box of the same design and with the same quantity of wet peat mulch was placed outside but close to the chamber. A steady radio wave of the frequency 27 MHz and the power 70 W was emitted for 72 hours. When the experiment was started the temperature was 17° C. in the chamber and its boxes, outside the chamber and in the reference box. At the end of the experiment the temperature still was 17° C. outside the chamber and in the reference box. The temperature in all the boxes A–H increased during the course of the experiment by an average of 4° C. four each period of 24 hours. This is shown in the diagram in FIG. 2.

I claim:

1. A method for heating a dielectric material, comprising the steps of:

placing the dielectric material in a closed chamber having walls which reflect electromagnetic waves; and emitting electromagnetic waves within a frequency range of 300 kHz–299 MHz from at least one antenna located in said chamber to heat the dielectric material wherein said emitted electromagnetic waves have a half wavelength that is greater than the square root of the smallest cross-section area of said chamber.

2. A method as in claim 1 wherein the dielectric material has a dielectric constant within a range of $2 \times 10^{-12}$–$8 \times 10^{-9}$ As/Vm.

3. A method as in claim 1 wherein the dielectric material is selected from the group consisting of materials of organic nature and a mixture of materials of organic nature and inorganic materials including water and aluminum oxide for compost making, drying, cooking, sterilizing, pasteurizing or other microbiological or chemical treatment.

4. A method as in claim 3 wherein the compost making and microbiological treatments have a moisture content within a range of 30%–90% by weight and a temperature within a range of 20° C.–80° C.

5. An apparatus for heating a dielectric material comprising:

a closed chamber having walls made of a material which reflects electromagnetic waves; and at least one antenna located in said chamber for emitting electromagnetic waves within the frequency range of 300 kHz–299 MHz to heat the dielectric material;

wherein the square root of the smallest cross-section area of the chamber is less than a half wavelength of any applied frequency within said frequency range.

6. An apparatus of claim 5 wherein the antenna is attached to a high frequency generator through a connecting arrangement and said antenna and connecting arrangement form a resonance entity wherein a discrepancy of the frequency of the high frequency generator to the resonance of the resonance entity is within the interval ±20% of the generator frequency.

7. An apparatus of claim 6 wherein the walls are made from electrically conductive material and said walls together with at least one high frequency generator are connected to a common reference potential.

8. An apparatus of claim 6 wherein the chamber has a shape of a parallelepiped and an upper wall, a bottom wall and side walls.

9. An apparatus of claim 6 wherein the walls comprise a net made from electrically conductive material.

10. An apparatus of claim 5 wherein the walls are made from electrically conductive material and said walls together with at least one high frequency generator are connected to a common reference potential.

11. An apparatus of claim 10 wherein the chamber has and side walls. shape of a parallelepiped and an upper wall, a bottom wall an 12. An apparatus of claim 10 wherein the walls comprise a net made from electrically conductive material.

13. An apparatus of claim 5 wherein the chamber has a shape of a parallelepiped and an upper wall, a bottom wall and side walls.

14. An apparatus of claim 5 wherein the walls comprise a net made from electrically conductive material.

15. An apparatus of claim 5 further including a plurality of high frequency generators and each high frequency generator is connected to a separate antenna through a connecting arrangement wherein each antenna and associated connecting arrangement form a separate resonance entity and a discrepancy of the frequency of each generator to the resonance entity is within the interval ±20% of the generator frequency.

* * * * *